(12) United States Patent
Lai et al.

(10) Patent No.: US 10,031,340 B2
(45) Date of Patent: Jul. 24, 2018

(54) HEAD MOUNTED DEVICE

(71) Applicant: Beijing Pico Technology Co., Ltd., Beijing (CN)

(72) Inventors: Yi Lai, Beijing (CN); Guanghui Liu, Beijing (CN)

(73) Assignee: BEIJING PICO TECHNOLOGY CO., LTD., Beijing (CN)

( * ) Notice: Subject to any disclaimer, the term of this patent is extended or adjusted under 35 U.S.C. 154(b) by 26 days.

(21) Appl. No.: 15/115,861

(22) PCT Filed: Feb. 19, 2016

(86) PCT No.: PCT/CN2016/074159
§ 371 (c)(1),
(2) Date: Aug. 1, 2016

(87) PCT Pub. No.: WO2017/113487
PCT Pub. Date: Jul. 6, 2017

(65) Prior Publication Data
US 2018/0003984 A1    Jan. 4, 2018

(30) Foreign Application Priority Data

Dec. 31, 2015  (CN) .......................... 2015 1 1034072

(51) Int. Cl.
*G09G 5/00*       (2006.01)
*G02B 27/01*     (2006.01)
*A42B 7/00*       (2006.01)
*H04N 13/04*     (2006.01)

(52) U.S. Cl.
CPC ............ *G02B 27/0176* (2013.01); *A42B 7/00* (2013.01); *H04N 13/044* (2013.01); *G02B 2027/0156* (2013.01)

(58) Field of Classification Search
CPC .... G02B 27/0176; A42B 7/00; H04N 13/044; G06F 3/012
USPC ............... 345/2.1, 8, 419, 633, 690; 349/74; 340/980; 348/158
See application file for complete search history.

(56) References Cited

U.S. PATENT DOCUMENTS 5,671,037 A * 9/1997 Ogasawara ........ G02B 27/0176
  2/421
5,976,063 A * 11/1999 Joutras ................. A43B 1/0054
  482/114

(Continued)

*Primary Examiner* — Prabodh M Dharia
(74) *Attorney, Agent, or Firm* — Harness, Dickey & Pierce, P.L.C.

(57) ABSTRACT

A head mounted device includes a virtual reality helmet, a control section, a transmission line and a head band portion. The head band portion includes a rotatable head band detachably positioned on the virtual reality helmet via a connection mechanism including a catching connection portion and a fixing portion having a main body portion. The catching connection portion is mounted in a counterbore of the rotatable head band and includes a catching fixture, two catching halves, a push button and a first elastic part. A driving portion of the bush button moves upward vertically and drives the action of the two driven portions of two catching halves to open or close two catching portions of the catching halves transversely, and thus perform the connection or detachment with the caught portion on the main body portion of the fixing portion.

7 Claims, 8 Drawing Sheets

(56) References Cited

U.S. PATENT DOCUMENTS

| | | | | |
|---|---|---|---|---|
| 6,124,837 A | * | 9/2000 | Usuki | G02B 7/12 340/980 |
| 2001/0056282 A1 | * | 12/2001 | Sonnenschein | A61B 1/0005 606/139 |
| 2002/0132212 A1 | * | 9/2002 | Hou | G10H 1/0033 434/307 A |
| 2006/0243100 A1 | * | 11/2006 | Junkers | B25B 21/005 81/57.38 |
| 2010/0246023 A1 | * | 9/2010 | Tanaka | G02B 27/0176 359/630 |
| 2012/0236030 A1 | * | 9/2012 | Border | G02B 27/0093 345/633 |
| 2012/0293506 A1 | * | 11/2012 | Vertucci | G06F 3/012 345/419 |
| 2013/0249776 A1 | * | 9/2013 | Olsson | G06F 1/163 345/8 |
| 2014/0333773 A1 | * | 11/2014 | Davis | H04N 5/2252 348/158 |
| 2015/0044662 A1 | * | 2/2015 | Goto | G06F 3/011 434/365 |
| 2016/0167672 A1 | * | 6/2016 | Krueger | A61M 21/00 340/576 |
| 2016/0178148 A1 | * | 6/2016 | Kim | F21K 9/60 362/235 |
| 2016/0370590 A1 | * | 12/2016 | Fujishiro | G02B 27/0176 |

* cited by examiner

HEAD MOUNTED DEVICE

FIELD OF THE INVENTION

The present disclosure relates to a head mounted device.

BACKGROUND OF THE INVENTION

At present, most head mounted devices available on the market have to be connected with other peripheral devices such as game players, personal computers and cell phones, etc., so as to operate. Meanwhile head mounted devices available on the market are not satisfactory in terms of man-machine interaction functions. For most head mounted devices have defects, such as uncomfortable wearing, inconvenient adjustments during wearing, inconvenient wear of earphones, impossible to acquire outside information conveniently while wearing the device, and etc.

SUMMARY OF THE INVENTION

In view of the above mentioned problems, the present invention proposes a head mounted device to solve all or part of the problems.

In order to achieve the above object, the technical solutions of the present invention are:

The present invention proposes a head mounted device, which includes a virtual reality helmet, a control section, a transmission line and a head band portion. The virtual reality helmet includes a mask proximate to user's face and a display screen in front of the mask. The control section is connected with the virtual reality helmet as a whole via the transmission line, in order to control the operation of the head mounted device. The head band portion is intended to mount this virtual reality helmet onto the head of a user.

Preferably, the control section includes at least a signal source for providing the display screen with a video signal, a control panel used as a man-machine interaction interface, a power supply for supplying electricity for the virtual reality helmet and the control section, a charge port for charging the power supply when the power of power supply is low, and a wireless connection unit for wireless connection with a peripheral device wherein the wireless connection unit includes a BLUETOOTH® module and/or a WiFi module.

Preferably, the transmission line is integrated with a high speed signal line for transmitting video signals and current and an earphone signal line for transmitting audio signals. The transmission line is provided with an earphone seat. And the earphone seat is provided with an earphone hub for connecting with the earphone signal line.

Further preferably, the head mounted device also includes a microphone for picking up voice signals and a camera module. The microphone is intended to pick up voice signals and placed at a location corresponding to the location above the nose bridge on the mask of the virtual reality helmet. Alternatively, the microphone is arranged on the earphone seat of the transmission line. The camera module is built-in in front of the virtual reality helmet so as to pick up video images of the outside environment without putting off the virtual reality helmet.

Preferably, the head band portion includes a rotatable head band which is detachably positioned on left and right sides of the virtual reality helmet by means of a connection mechanism. Additionally, the rotatable head band is rotatable around the virtual reality helmet.

In a preferred embodiment, the connection mechanism includes a spindle and a base located within the virtual reality helmet. The base includes an annular nesting portion, a bead holding sleeve and at least one elongated housing slot. The bead holding sleeve is nested and fixed in the inner ring of the nesting portion. An open end of the housing slot is opened to the nesting portion. A compression spring is provided in the housing slot. A bead located at the side where the free end of the compression spring locates is housed in the housing slot. An open end of the bead holding sleeve corresponding to each housing slot is provided with a holding opening. Under the action of the compression spring, the bead is snapped at the open end of the housing slot by the holding opening of the bead holding sleeve. One end of the spindle is intended to be connected with the rotatable head band while the other end has a groove. Under the action of an external force, the other end of the spindle having the groove is inserted into the bead holding sleeve and the portion of the bead protruding beyond the bead holding sleeve is snapped into the groove of the spindle.

In another preferred embodiment, the connection mechanism includes a fixing portion and a catching connection portion. A recess slot is arranged on the virtual reality helmet and the main body portion of the fixing portion is rotatably mounted on the bottom wall of the recess slot by a pin. A caught portion in the shape of an arch is arranged on the main body portion; and an insertion portion is arranged on the rotatable head band for cooperation with the recess slot. A counterbore in which the catching connection portion is mounted is made along the extension direction of the insertion portion. The catching connection portion includes a catching fixture, two opposite catching halves, a push button and a first elastic part, wherein:

the catching fixture is fixed on the shoulder of the counterbore; the two catching halves are rotatably mounted below the catching fixture by a shaft pin; one end of each opposite catching half is a driven portion, while the other end is intended to function as a catching portion connecting with the fixing portion. The push button slides relatively and is mounted with limit at the catching fixture, and there is a first elastic part mounted between the push button and the catching fixture. The push button includes a driving portion passing through the catching fixture, which moves upward vertically and drives the action of the two driven portions so as to open or close the two catching portions transversely and thus perform the connection or detachment with the caught portion.

Preferably, the head band portion includes a tightening adjuster which is located in the middle part of the rotatable head band so as to symmetrically tighten or loosen the rotatable head band.

In a preferred embodiment, the rotatable head band includes two head band halves. The tightening adjuster includes a cover which wraps the ends of two head band halves; elongated holes respectively arranged on the ends of the two head band halves, wherein a first rack portion is arranged on the upper inner wall of the first elongated hole and a second rack portion is arranged on the lower inner wall of the second elongated hole; an adjusting snob including three portions decreasingly smaller, wherein the first portion is an adjusting portion, the second portion is an external gear portion passing through the first and second elongated holes and mating respectively with the first and second rack portions, and the third portion is a mounting portion rotatably mounted on said cover; and a pawl-ratchet mechanism arranged on the cover and used to limit the adjusting snob so that it can only rotate in a single direction.

Further preferably, the pawl-ratchet mechanism includes an inner ratchet part arranged on the end face of the adjusting portion; a pawl moving axially and mounted with limit on the cover, wherein a guiding bevel face is provided on one side of the end of the pawl; a compression spring pushing the pawl so that the end of the pawl is mated with the inner ratchet part, after the mating of the pawl with the inner ratchet part, the adjusting snob 83 is able to rotate in a single direction by means of the guiding bevel face; and a tumbler block mounted on the cover and connected with the pawl, wherein said tumbler block is intended to detach the pawl from the inner ratchet part.

The embodiment of present invention presents the following beneficiary effects: the present invention proposes a complete head mounted device. By providing a control section to be connected with the virtual reality helmet, the head mounted device of the present invention does not need to connect with other peripheral devices and thus enhance the portability and the compatibility of the head mounted device.

In preferred embodiments, by providing an earphone seat on the transmission line, it is easier for the user to plug in/pull out the earphone; by providing a rotatable head band which is detachable and adjustable in angle and tension and by providing an adjusting head band which is detachable and adjustable in length, the comfort of wearing this head mounted device is improved, so that the head mounted device of the present invention is more human friendly; the present invention also provides a microphone and a camera module so as to enhance the man-machine interaction capability of the head mounted device.

The above description is merely a general introduction of the technical solutions of the present invention. In order to understand the technical solutions of the present invention more clearly, to carry out the same in accordance with the description, and to make the above and other objects, features and advantages become apparent, the following embodiments are provided as follows.

BRIEF DESCRIPTION OF THE DRAWINGS

Other advantages and beneficial effects are readily apparent for those skilled in the art upon reading the following detailed description of preferred embodiments. The accompanying figures are simply illustrative of the preferred embodiments but in no way intended to limit the present invention. Throughout the figures, like reference numbers refer to the same components. In the figures.

DETAILED DESCRIPTION OF THE PREFERRED EMBODIMENTS

In order to make the objects, technical solutions and advantages more clear, the implementations of the present invention will be described in detail with respect to accompanying figures. The wording "a/an" used in the context indicates a number, which is not limited to one.

First, it will briefly describe the orientation used in the implementations: the left-right direction and up-down direction of the head mounted device are used with respect to its normal wearing condition, wherein the left-right direction of the head mounted device is the direction along which the length of the display screen extends, and the up-down direction of the head mounted device is the direction along which the width of the display screen extends.

Embodiment I: Head Mounted Device

Figure 1:
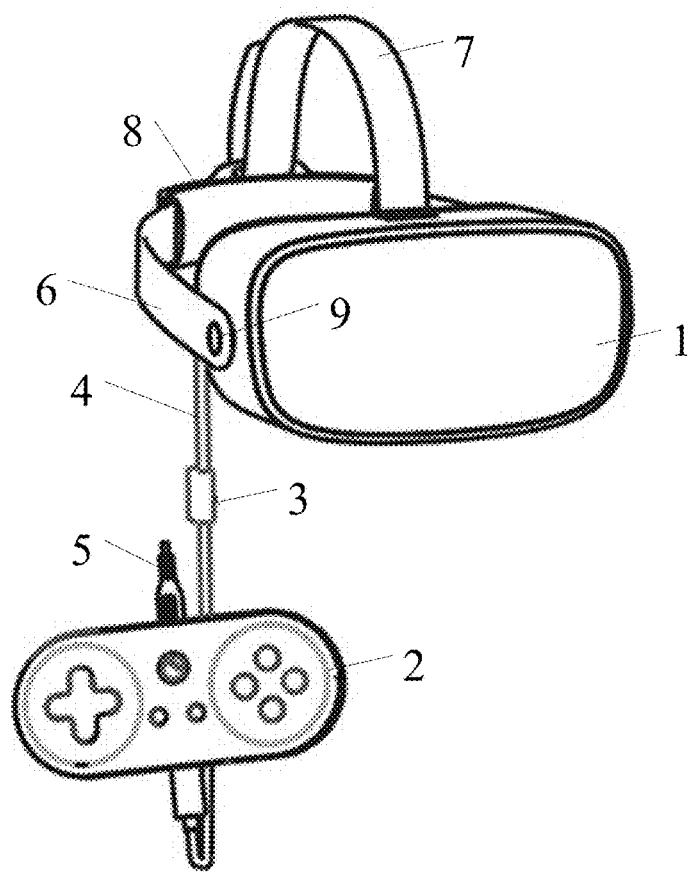
FIG. 1 is an overall schematic view of a head mounted device in accordance with Embodiment I.
Figure 2:
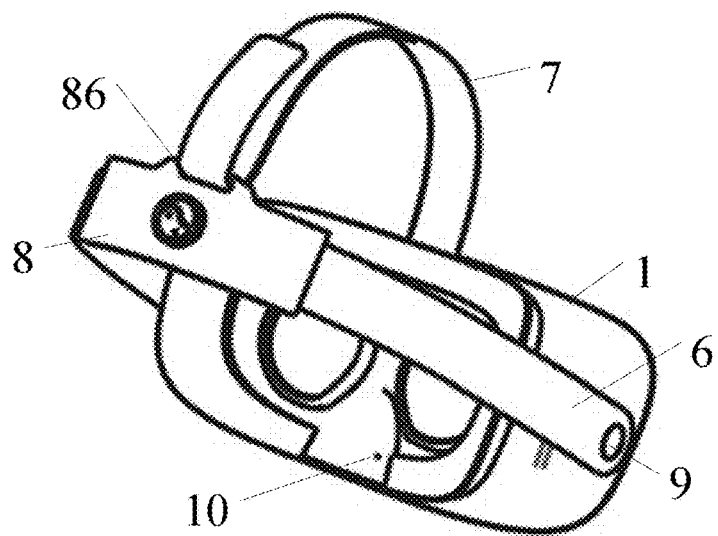
FIG. 2 is a rear view of a head mounted device in accordance with Embodiment I.

FIG. 1 is an overall schematic view of a head mounted device in accordance with Embodiment I, and FIG. 2 is a rear view of a head mounted device in accordance with Embodiment I. As shown in both FIGS. 1 and 2, the head mounted device of Embodiment I includes a virtual reality helmet 1, a control section 2, a transmission line 4 and a head band portion. The virtual reality helmet 1 includes a mask proximate to user's face and a display screen in front of the mask. The control section 2 is connected with the virtual reality helmet 1 as a whole via the transmission line 4, in order to control the operation of the head mounted device. The head band portion is intended to mount this virtual reality helmet 1 onto the head of a user.

In a preferred implementation, the control section 2 includes at least a signal source for providing the display screen with a video signal, a control panel used as a man-machine interaction interface, a power supply for supplying electricity for the virtual reality helmet 1 and the control section 2, and a charge port 5 for charging the power supply when the power of power supply is low.

As shown in FIG. 1, in practice, the control section 2 of the head mounted device may be designed to integrate the above-mentioned signal source, the control panel, the power supply, and the charge port into a smart box, by means of which the head mounted device is controlled.

In another preferred implementation, the control section 2 may also include a wireless connection unit for wireless connection with a peripheral device. For example, the control section 2 simply as a game handset may be wirelessly connected to a game player to perform the control of a peripheral device such as a game player. Specifically, the wireless connection unit includes a BLUETOOTH® module and/or a WiFi module.

In order for easy plug -in/pull -out of an earphone of the head mounted device, an earphone seat is provided on the transmission line in one implementation. Specifically, the control section 2 is connected to the virtual reality helmet 1 via the transmission line 4. The transmission line 4 is integrated with a high speed signal line for transmitting video signals and current and an earphone signal line for transmitting audio signals. The transmission line 4 is provided with the earphone seat 3. And the earphone seat 3 is provided with an earphone hub for connecting with the earphone signal line so that users can easily plug in/pull out the earphone through the earphone seat on the transmission line.

In order to fully develop the functions of the head mounted device of the present invention and better perform man-machine interaction, the head mounted device also includes a microphone and a camera module in another implementation. The microphone is intended to provide the voice input during man-machine interaction, and the camera module may observe outside environment anytime under the control of the user. Specifically, it is possible to place the microphone 10 for picking up the voice signal on the earphone seat 3 of the transmission line 4 in order to be used as a line control input. Referring to FIG. 2, it is also possible to place the microphone 10 at a location corresponding to the location above the nose bridge on the mask of the virtual reality helmet 1, which makes it possible not only to receive clear voice without noise, but also to place the microphone above the nose bridge of the mask of the virtual reality helmet without affecting the appearance. The camera module is built-in in front of the virtual reality helmet 1 so as to pick up video images of the outside environment and display the picked-up video images of the outside environment without putting off the virtual reality helmet 1. In practice, it is possible to use the video images picked up by the camera module as an input of a video game.

For the purpose of improving the comfort while wearing the head mounted device, as shown in FIGS. 1 and 2, in yet another implementation, the head band portion includes a rotatable head band 6 which is detachably positioned on left and right sides of the virtual reality helmet 1 by means of a connection mechanism 9. It is possible to detach the rotatable head band simply by pulling and thus it can be easily used and improve the portability of the head mounted device. Meanwhile, the rotatable head band 6 is rotatable around the virtual reality helmet 1 so that users with different head shapes can find themselves suitable wearing angles with enhanced wearing comforts.

Embodiment II: Implementations of a Connection Mechanism

In an implementation of the connection mechanism, as shown in FIGS. 3a to 3d, the connection mechanism 9 includes a spindle 92 and a base 91 located within the virtual reality helmet 1.

Figure 3A:
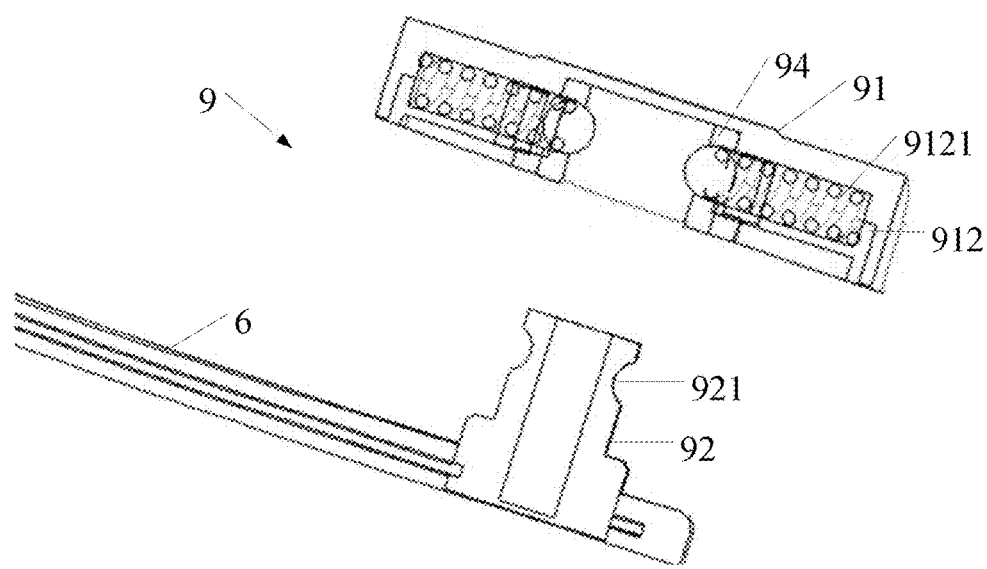
FIG. 3*a* is a schematic view of a connection mechanism in accordance with Embodiment II.
Figure 3B:
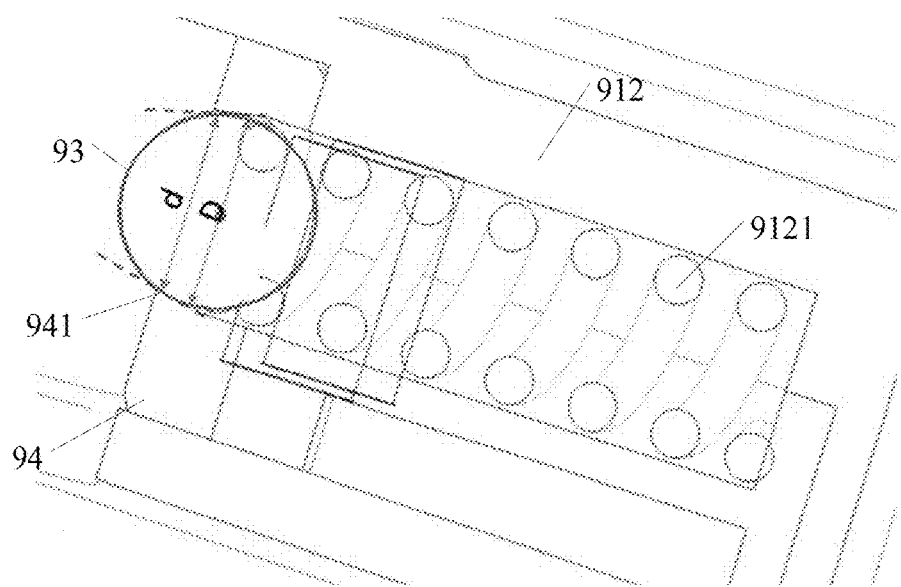
FIG. 3*b* is a schematic state view of a bead in accordance with Embodiment II wherein the bead is snapped at the open end of a housing slot by a bead holding sleeve under the action of a compression spring.
Figure 3C:
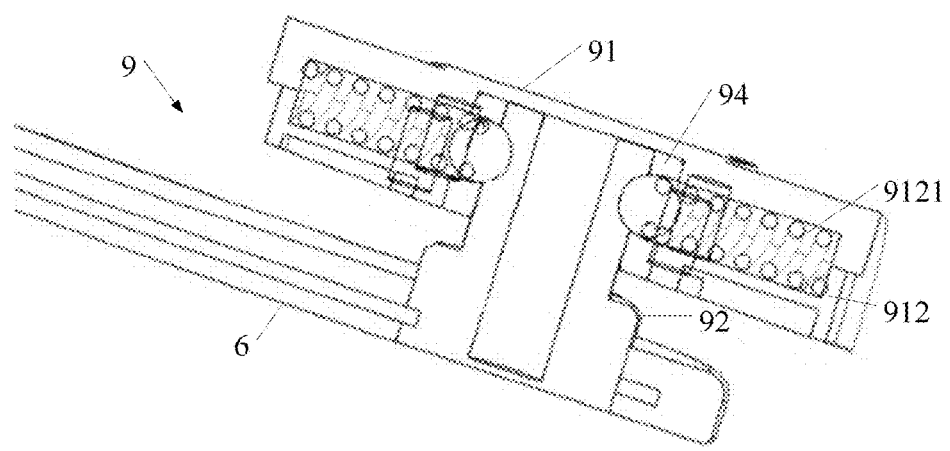
FIG. 3*c* is a schematic state view of a spindle in accordance with Embodiment II wherein the spindle is inserted into the bead holding sleeve.
Figure 3D:
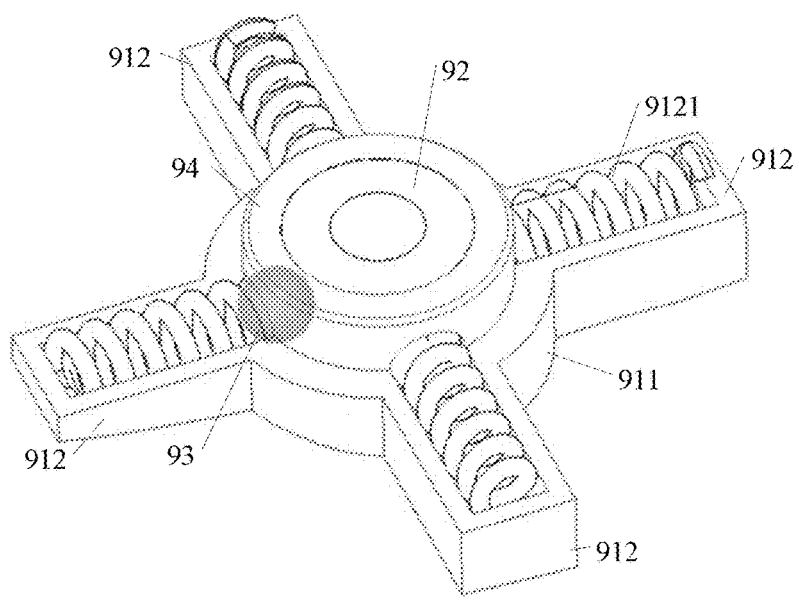
FIG. 3*d* is a schematic view of the connection mechanism with 4 housing slots in accordance with Embodiment II.

Referring to FIG. 3d, the base 91 includes an annular nesting portion 911, a bead holding sleeve 94 and at least one elongated housing slot 912. The bead holding sleeve 94 is nested and fixed in the inner ring of the nesting portion 911. An open end of the housing slot 912 is opened to the nesting portion 911. A compression spring 9121 is provided in the housing slot 912. A bead 93 is located at the side where the free end of the compression spring 9121 locates is housed in the housing slot 912.

Referring to FIG. 3b, an open end of the bead holding sleeve 94 corresponding to each housing slot 912 is provided with a holding opening 941. Under the action of the compression spring 9121, the bead 93 is snapped at the open end of the housing slot 912 by the holding opening 941 of the bead holding sleeve 94, wherein the holding opening 941 may be a reducing caliber opening, whose caliber decreases from outside/outer to inside/inner and the inner caliber is less than the diameter of the bead 93. "Outside/outer" of reducing caliber opening used herein is the side close to the bead while "inside/inner" is the side close to the spindle. Preferably, when the bead holding sleeve 94 has a certain thickness, the holding opening 941 is a reducing caliber opening. Apparently, the holding opening 941 in this embodiment may also be an opening with a constant caliber. The caliber of this opening with a constant caliber is less than the diameter of the bead 93. Preferably, when the bead holding sleeve 94 has a rather thin thickness, the holding opening 941 is an opening with a constant caliber.

Referring to FIGS. 3a and 3c, one end of the spindle 92 is intended to be connected with the rotatable head band 6 while the other end has a groove 921 which is fitted with a portion of the bead 93 protruding beyond the bead holding sleeve. Under the action of an external force, the other end of the spindle 92 having the groove 921 is inserted into the bead holding sleeve 94, and the portion of the bead 93 protruding beyond the bead holding sleeve 94 is snapped into the groove 921 of the spindle 92.

It should be mentioned that the groove 921 in FIG. 3a is shown in an arch shape for the purpose of schematic illustration, the groove 921 in this embodiment may also be rectangular or trapezoidal as long as the groove 921 is able to cooperate with the portion of the bead 93 protruding beyond the bead holding sleeve so as to securely snap the spindle into the bead holding sleeve 94.

In this application, the rotatable head band can be fastened to left and right sides of the virtual reality helmet by the following process: under the action of an external force, for example by pressing the rotatable head band 6, the end of the spindle 92 having the groove 921 is inserted into the bead holding sleeve 94 until the groove 921 of the spindle 92 is perfectly engaged with the portion of the bead 93 protruding beyond the bead holding sleeve 94; and the spindle 92 cannot escape from the base 91 because of being blocked by the bead 93, which makes it possible for the connection of the rotatable head band 6 with the base 91. Because both the surface of the bead 93 and the inner surface of the bead holding sleeve 94 are smooth, the rotatable head band 6 can rotate freely within the bead holding sleeve 94 under the action of an external force.

In this application, the rotatable head band can be detached from the virtual reality helmet by the following process: under the action of an external force, for example by pulling outward the rotatable head band 6, the groove 921 of the spindle 92 is detached from the bead 93 and the bead 93 is pushed back under the thrust of the spindle 92; when the bead 93 is entirely back into the housing slot 912, the rotatable head band 6 takes the spindle 92 out of the connection with the base 91.

It should be mentioned that, to ensure the ease of the rotation of the rotatable head band, the base 91 preferably includes even number of the housing slots 912 which are symmetrically distributed around the nesting portion 911. As shown in FIG. 3d, the base 91 is provided with 4 housing slots located regularly and symmetrically around the nesting portion 911.

Figure 4A:
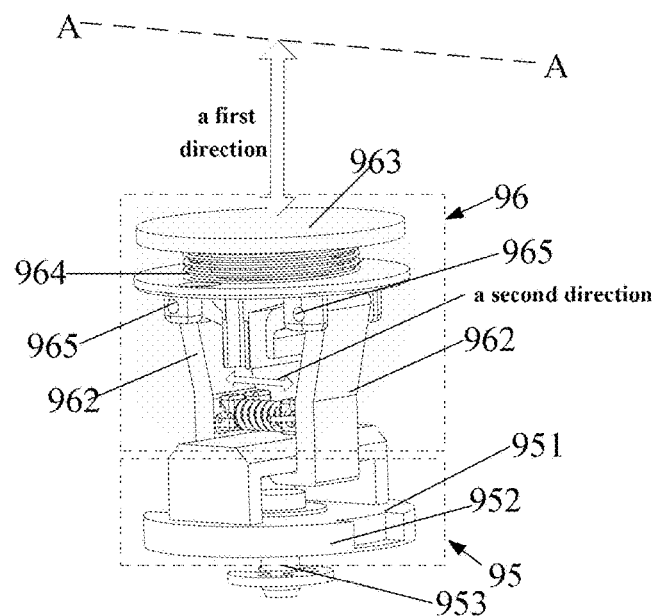
FIG. 4*a* is a schematic view of another connection mechanism in accordance with Embodiment II.
Figure 4B:
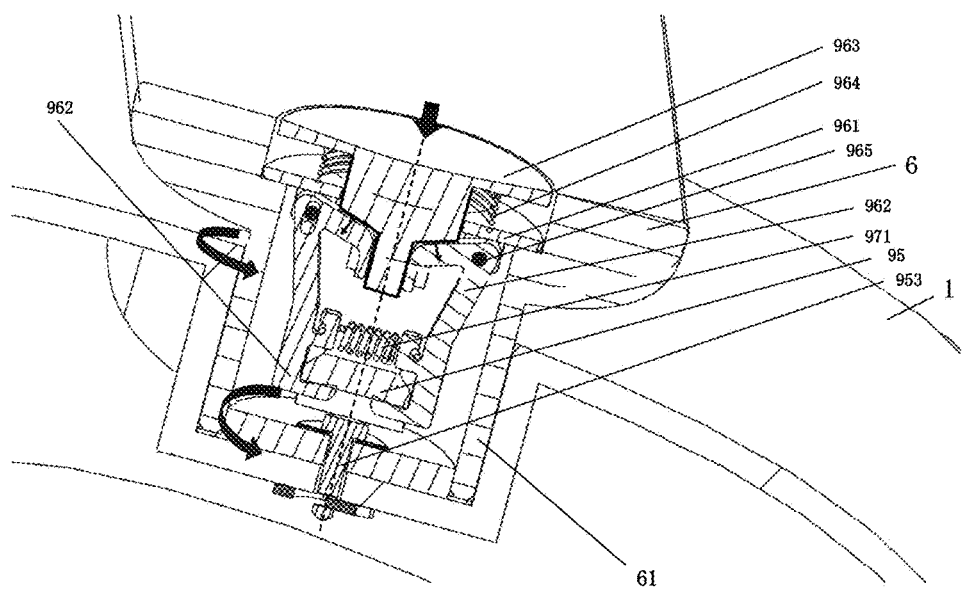
FIG. 4*b* is a sectional view of the connection mechanism in FIG. 4*a* along the dotted line A-A.
Figure 4C:
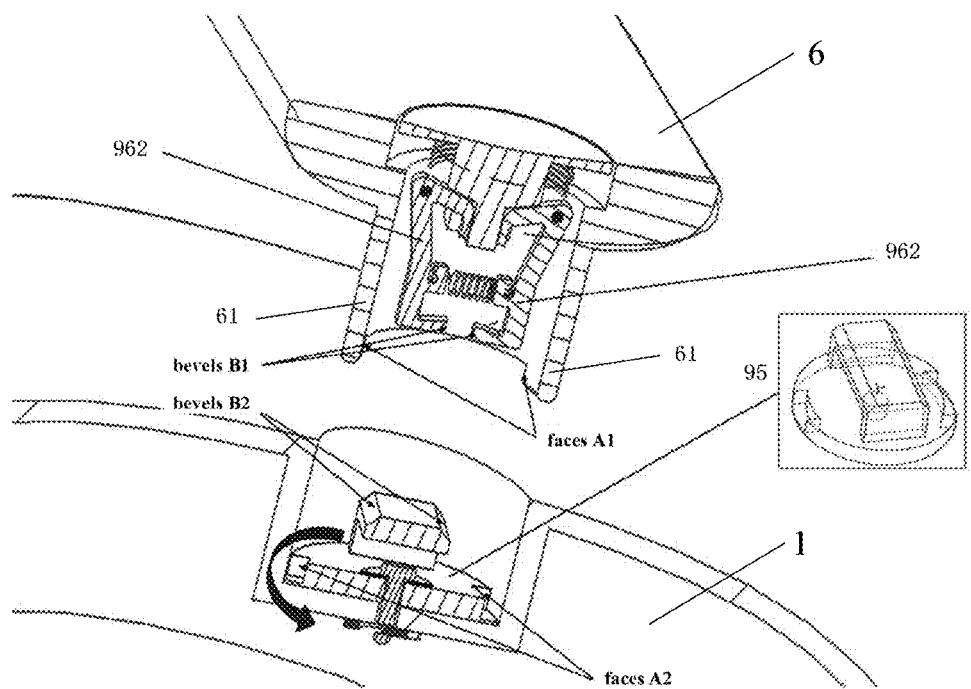
FIG. 4*c* is a schematic view of the connection mechanism in accordance with Embodiment II after disassembly.

In another implementation of the connection mechanism, as shown in FIGS. 4a to 4c, the connection mechanism 9 includes a fixing portion 95 and a catching connection portion 96. As shown in FIGS. 4a and 4b, a recess slot is arranged on the virtual reality helmet 1 and the main body portion 952 of the fixing portion 95 is rotatably mounted on the bottom wall of the recess slot by a pin 953. A caught portion 951 in the shape of an arch is arranged on the main body portion 952; and an insertion portion 61 is arranged on the rotatable head band 6 for cooperation with the recess slot. A counterbore in which the catching connection portion 96 is mounted is made along the extension direction of the insertion portion 61. The catching connection portion 96 includes a catching fixture 961, two opposite catching halves 962, a push button 963 and a first elastic part 964, wherein, the catching fixture 961 is fixed on the shoulder of the counterbore; the two catching halves 962 are rotatably mounted below the catching fixture 961 by a shaft pin 965; one end of each opposite catching half 962 is a driven portion, while the other end is intended to function as a catching portion connecting with the fixing portion 95. The push button 963 slides relatively and is mounted with limit at the catching fixture 961, and there is a first elastic part 964 mounted between the push button 963 and the catching fixture 961. The push button 963 includes a driving portion passing through the catching fixture 961, which moves upward vertically and drives the action of the two driven portions so as to open or close the two catching portions transversely and thus perform the connection or detachment with the caught portion 951.

Figure 4D:
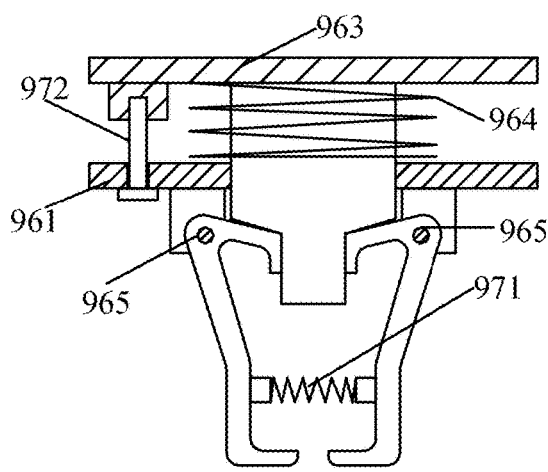
FIG. 4*d* is a schematic structural view of a first catching connection portion in accordance with Embodiment II.
Figure 4E:
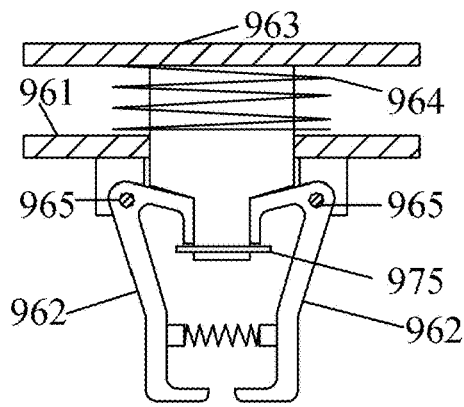
FIG. 4*e* is a schematic structural view of a second catching connection portion in accordance with Embodiment II.

In a particular implementation, as shown in FIGS. 4d and 4e, the driving portion of the push button 963 is not connected with the driven portions of the two catching halves 962, and the driving portion is in contact with but not connected with the driven portions; a second elastic part 971 for return is provided between the catching portions of the two catching halves 962. The connection mechanism 9 includes a stopper structure for limiting the upward displacement of the push button 963. Specifically, as shown in FIG. 4d, the stopper structure includes a through hole located on the catching fixture 961, a threaded blind hole located on the push button 963, and a bolt 972 which passes upward through the through hole of the catching fixture 961 and is screwed with the threaded blind hole on the push button 963. Alternatively, as shown in FIG. 4e, the stopper structure includes a stopper plate 975 fixed at the end of the driving portion and the stopper plate is blocked by the driven portions of the at least one catching half 962 upon moving upward to the maximum displacement.

Figure 4F:
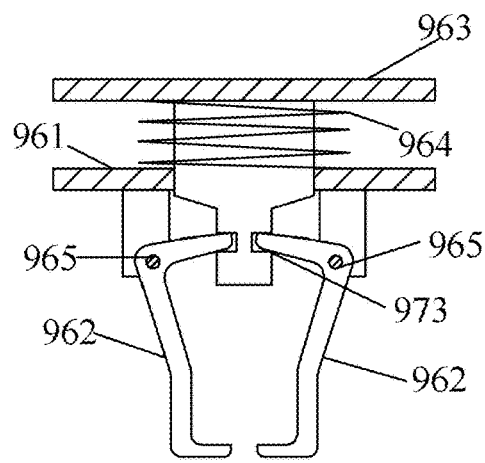
FIG. 4*f* is a schematic structural view of a third catching connection portion in accordance with Embodiment II.
Figure 4G:
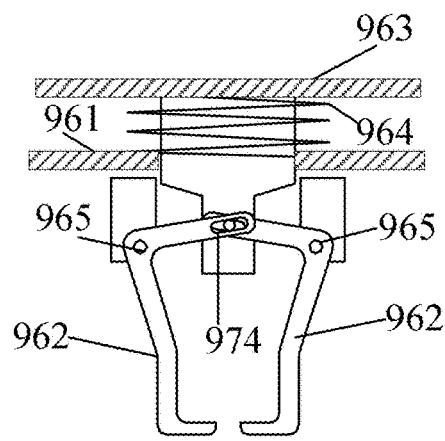
FIG. 4*g* is a schematic structural view of a fourth catching connection portion in accordance with Embodiment II.
Figure 5A:
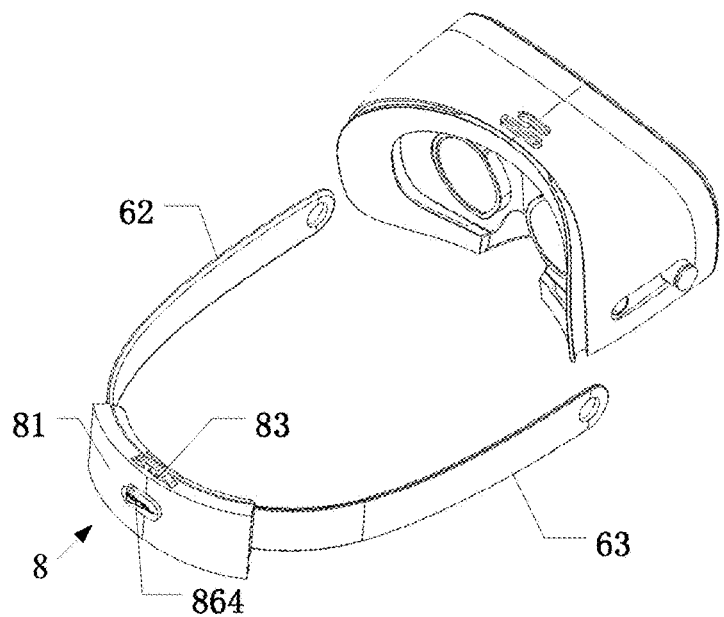
FIG. 5*a* is a schematic structural view of a head mounted device in accordance with Embodiment III.
Figure 5B:
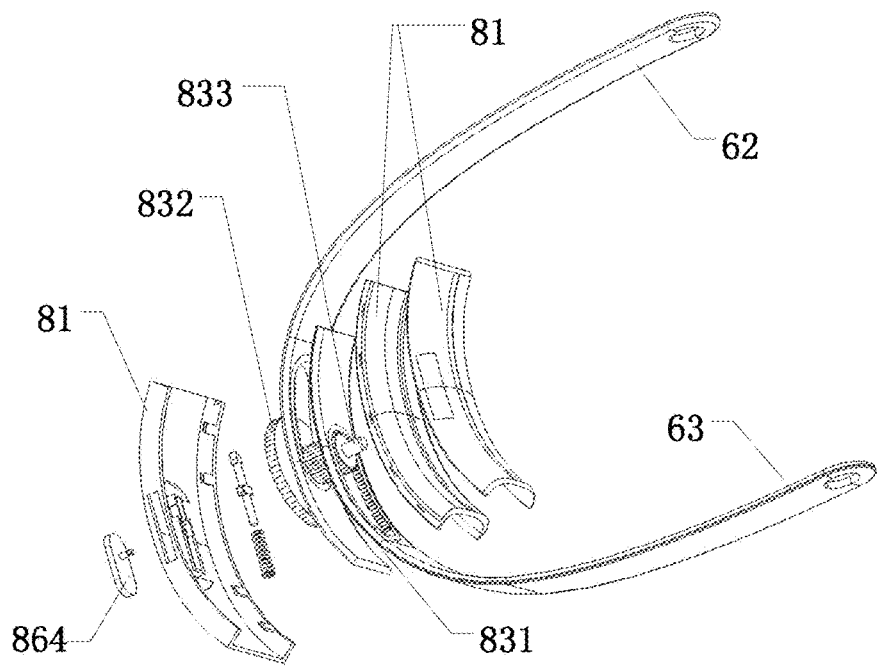
FIG. 5*b* is an exploded structural view of a tightening adjuster in accordance with Embodiment III.
Figure 5C:
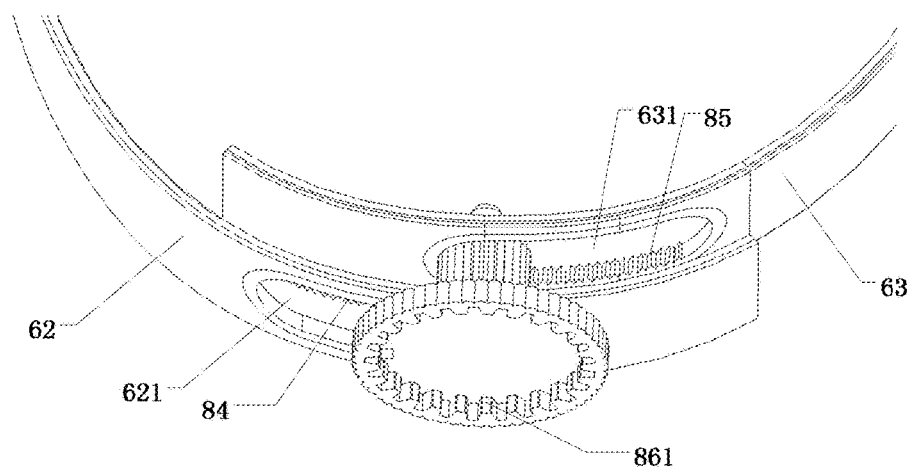
FIG. 5*c* is a schematic view of the connection state the tightening adjuster in accordance with Embodiment III connected with a rotatable head band.
Figure 5D:
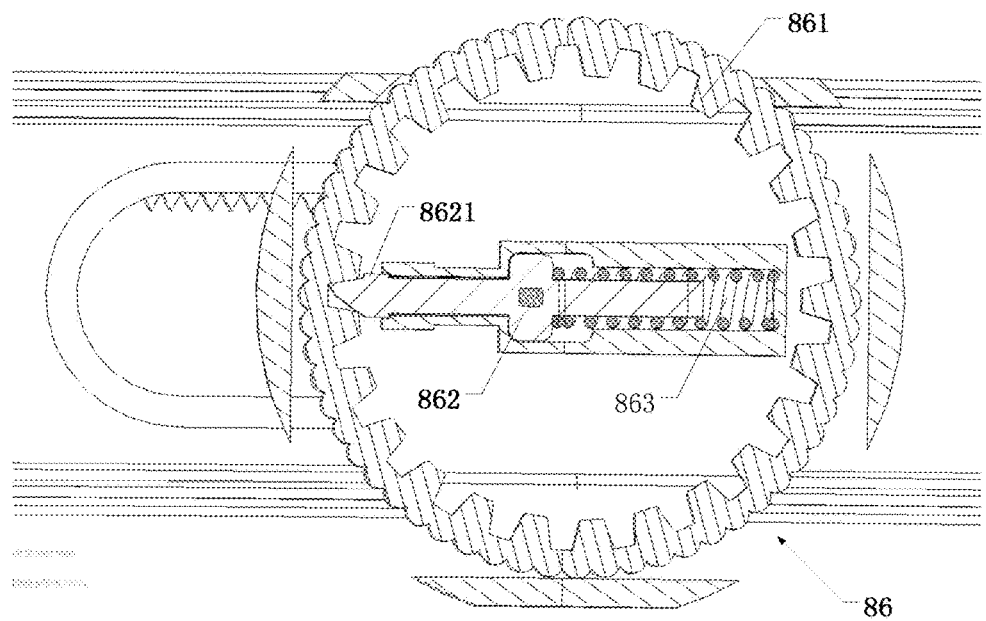
FIG. 5*d* is a partial sectional view of the cooperation of a pawl with ratchet structure of the tightening adjuster in FIG. 5*b*.

In another implementation, as shown in FIGS. 4f and 4g, the driving portion of the push button 963 is movably connected with the driven portions of the two catching halves 962; the driving portion moves upward vertically and causes the two driven portions to rotate around the shaft pin 965 in a forward/backward direction. Specifically, the driving portion and the driven portions are movably connected with each other through any one of the following manners: as shown in FIG. 4f, a mounting slot 973 in which the ends of the two driven portions are respectively inserted is made on the driving portion, and there are gaps for the two driven portions within the mounting slot 973 so as to cause the two driven portions to rotate around the shaft pin 965 in a forward/backward direction when the driving portion move upward vertically. Alternatively, as shown in FIG. 4g, a circular hole is made on the driving portion while an elongate hole 974 is made on the end of either driven portion; and a shaft pin 965 passes through the circular hole on the driving portion and the elongate holes 974 on the two driven portions so as to cause the two driven portions to rotate around the shaft pin 965 in a forward/backward direction when the driving portion move upward vertically.

In practice, the first elastic part 964 may be a spring specifically which can expand/compress in a first direction as shown in FIG. 4a. The push button 963 is pressed down by pressure (in a direction of the arrow as shown in FIG. 4b) and return to the rest condition again after the pressure disappears.

Referring to FIG. 4a, when the push button 963 is subjected to a downward pressure in a first direction, the first elastic part 964 compresses, the push button 963 control its driving portion to slide downward, the sliding of the driving portion controls the sliding of the driven portions of the two catching halves 962 which then controls the opening of the catching portions of the two catching halves 962 along a second direction as shown in FIG. 4a, making it possible to detach from the fixing portion 95, that is, to detach the catching connection portion 96 of the connection mechanism 9 from the fixing portion 95. This causes the detachment of the virtual reality helmet 1 from the rotatable head band 6. Furthermore, when the pressure is removed, the first elastic part 964 expands and returns to initial length; the expansion of the first elastic part 964 controls the sliding upward in the first direction of the push button 963, which further brings the driving portion to slide upward. The sliding of the driving portion controls the sliding of the driven portions of the two catching halves 962 which then controls the closing of the catching portions of the two catching halves, making it possible for the connection with the fixing portion 95.

As shown in FIG. 4c, when the push button 963 is pressed down along the direction of an arrow as shown in FIG. 4b, the bevels B1 on the two catching halves 962 slide in along the bevels B2 of the fixing portion 95 until the two catching halves 962 completely catch the fixing portion 95, in particularly the caught portion 951 of the fixing portion 95, causing the connection mechanism 9 to be assembled onto the virtual reality helmet 1. Meanwhile, faces AI in the insertion portion 61 of the rotatable head band 6 mate with faces A2 in the recess of the main body portion 952; here, in case that the main body portion 952 is circular, after the faces A2 mate with the faces AI, the rotatable head band 6 is in rotation with the fixing portion 95. As such, it is possible for the rotatable head band 6 to freely rotate in relative to the virtual reality helmet 1 by means of the connection mechanism 9.

Embodiment III: Head Band Portion

In a preferred implementation, the head band portion includes a tightening adjuster 8 which is intended to symmetrically tighten or loosen the rotatable head band 6 so as for the user to easily adjust the tension of the head mounted device and improve user's feeling.

As shown in FIGS. 5a-5d, the rotatable head band 6 includes two head band halves 62 and 63. The tightening adjuster 8 includes a cover 81 which wraps the two head band halves 62 and 63; elongated holes respectively arranged on the ends of the two head band halves 62 and 63, wherein a first rack portion 84 is arranged on the upper inner wall of the first elongated hole 621 and a second rack portion 85 is arranged on the lower inner wall of the second elongated hole 631; an adjusting snob 83 including three portions decreasingly smaller, wherein the first portion is an adjusting portion 832, the second portion is an external gear portion 831 passing through the first elongated hole 621 and second elongated hole 631 and mating respectively with the first rack portion 84 and second rack portion 85, and the third portion is a mounting portion 833 rotatably mounted on said cover 81; and a pawl-ratchet mechanism 86 arranged on the cover 81 and used to limit the adjusting snob 83 so that it can only rotate in a single direction. Specifically, rotation in a single direction of the adjusting snob 83 is intended to tighten the rotatable head band 6.

When worn by the user, the user should push the tumbler block 864 at first so as to release the mating between the pawl-ratchet mechanism 86, and then turn the adjusting portion 832 in a first direction, for example turn the adjusting portion 832 in counter-clockwise direction, or pull out the two head band halves 62 and 63. Because of the fact that the external gear portion 831 is mated with the first rack portion 84 and the second rack portion 85, the two head band halves move in opposite directions simultaneously making it possible to loosen the rotatable head band 6. And then pushing the tumbler block 864 makes it possible for the pawl-ratchet mechanism 86 to mate again.

After wearing the helmet, by turning the adjusting portion 832 in a second direction, for example turning the adjusting portion 832 in a clockwise direction, or by pushing inward the two head band halves 62 and 63, and because of the fact that the external gear portion 831 is mated with the first rack portion 84 and the second rack portion 85, the two head band halves move in the opposite direction simultaneously making it possible to tighten the rotatable head band 6 so that the helmet is secured on user's head. During wearing, because the mating of the pawl-ratchet mechanism 86, the adjusting snob 83 is limited to rotate in a single direction and thus the rotatable head band 6 will not be loosened.

Specifically, the pawl-ratchet mechanism has several implementations. In this embodiment, said pawl-ratchet mechanism 86 includes an inner ratchet part 861 arranged on the end face of the adjusting portion 832; a pawl 862 moving axially and mounted with limit on the cover 81, wherein a guiding bevel face 8621 is provided on one side of the end of the pawl 862; a compression spring 863 pushing the pawl 862 so that the end of the pawl 862 is mated with the inner ratchet part 861, after the mating of the pawl 862 with the inner ratchet part 861, said adjusting snob 83 is able to rotate in a single direction by means of the guiding bevel face 8621; and a tumbler block 864 mounted on the cover 81 and connected with the pawl 862, wherein said tumbler block 864 is intended to detach the pawl 862 from the inner ratchet part 861.

In the above mentioned structure, in natural state, the compression spring 863 pushes the pawl 862 so that the end of the pawl 862 is mated with the inner ratchet part 861. In this state, the adjusting snob 83 can only rotate in a single direction which is clockwise direction for this implementation so as to tighten the rotatable head band 6. When it is required to release the mating of the pawl-ratchet mechanism 86, simply pushing the tumbler block 864 sets the pawl 862 in motion which causes its end to detach from the inner ratchet part 861.

In another preferred implementation, the head band portion also includes an adjusting head band 7. As shown in FIGS. 1 and 2, one end of the adjusting head band 7 is detachedly connected to the central point above the virtual reality helmet 1. The adjusting head band may be easily detached by simply pressing it so that it may be easily used and this improves the portability of the head mounted device. The other end of the adjusting head band 7 passes through a long hole in the center above the tightening adjuster 8, and then it is secured by Velcro tapes which are designed to easily control the length of the adjusting head band so as to enhance the stability and comfort while wearing the head mounted device.

In summary, the present invention proposes a head mounted device with a novel configuration: i. by providing a control section to be connected with the virtual reality helmet, the head mounted device disclosed herein does not need to connect with other peripheral devices and thus enhance the portability and the compatibility thereof; ii. by providing an earphone seat on the transmission line, it is easier for the user to plug in/pull out the earphone; iii. by providing a rotatable head band which is detachable and adjustable in angle and tension and by providing an adjusting head band which is detachable and adjustable in length, the comfort of wearing this head mounted device is improved so that the head mounted device is more human friendly; iv. the present invention provides a microphone and a camera module so as to enhance the man-machine interaction capability of the head mounted device.

The above description is merely the best modes for carrying out the present invention, but it is not intended to limit the protection scope thereof. Any modifications, equivalent alternatives and variations fall within the protection scope of the present invention without departing from the concept and principles of the present invention.

The invention claimed is:

1. A head mounted device comprising a virtual reality helmet defining a recess slot, a control section, a transmission line and a head band portion, the virtual reality helmet including a mask proximate to a face of a user and a display screen in front of the mask, the control section connected with the virtual reality helmet via the transmission line to control operation of the head mounted device, the head band portion adapted to mount the virtual reality helmet onto a head of the user, the head band portion including a rotatable head band detachably positioned on left and right sides of the virtual reality helmet via a connection mechanism, the rotatable head band rotatable around the virtual reality helmet and including an insertion portion for cooperation with the recess slot, the connection mechanism including a catching connection portion and a fixing portion, the fixing portion including a main body portion and a caught portion in the shape of an arch arranged on the main body portion, the main body portion rotatably mounted on a bottom wall of the recess slot with a pin, the insertion portion defining a counterbore along an extension direction of the insertion portion, the catching connection portion mountable in the counterbore, the catching connection portion including a catching fixture fixed on a shoulder of the counterbore, two opposite catching halves, a push button and a first elastic part, the two catching halves rotatably mounted below the catching fixture with a shaft pin, one end of each opposite catching half including a driven portion, the other end of said each opposite catching half including a catching portion connecting with the fixing portion, the push button mounted with limit to the catching fixture via a first elastic part, the push button slides relative to the catching fixture, the push button including a driving portion passing through the catching fixture, and the driving portion moveable upward vertically to drive action of the driven portion of said each opposite catching half to open or closer the catching portion of said each opposite catching half transversely to allow connection or detachment with the caught portion.

2. The head mounted device as set forth in claim 1 wherein the control section includes a signal source for providing the display screen with a video signal, a control panel usable as a man-machine interaction interface, a power supply for supplying power to the virtual reality helmet and the control section, a charge port for charging the power supply, and a wireless connection unit for wireless connection with a peripheral device, and wherein the wireless connection unit includes a BLUETOOTH® module and/or a WiFi module.

3. The head mounted device as set forth in claim 1 wherein the transmission line is integrated with a high speed signal line for transmitting video signals and current and an earphone signal line for transmitting audio signals, and wherein the transmission line includes an earphone seat having an earphone hub for connecting with the earphone signal line.

4. The head mounted device as set forth in claim 3 further comprising a microphone and a camera module, wherein the microphone adapted to pick up voice signals, the microphone located above a nose bridge on the mask of the virtual reality helmet, or on the earphone seat of the transmission line, and the camera module built-in in front of the virtual reality helmet to pick up video images of the outside environment without removing the virtual reality helmet.

5. The head mounted device as set forth in claim 1 wherein said head band portion includes a tightening adjuster located in a middle part of the rotatable head band to symmetrically tighten or loosen the rotatable head band.

6. The head mounted device as set forth in claim 5 wherein the rotatable head band includes two head band halves, and wherein the tightening adjuster includes a cover wrapping ends of two head band halves, elongated holes including a first elongated hole and a second elongated hole respectively arranged on the ends of the two head band halves, an adjusting snob including three portions decreasingly smaller, and a pawl-ratchet mechanism arranged on the cover, the first elongated hole including an upper inner wall having a first rack portion, the second elongated hole including a lower inner wall having a second rack portion, the first portion of the three portions including an adjusting portion, the second portion of the three portions including an external gear portion passing through the first elongated hole and the second elongated hole and mating with the first rack portion and the second rack portion, respectively, and the third portion of the three portions including a mounting portion rotatably mounted on the cover, and the pawl-ratchet mechanism adapted to limit the adjusting snob so that it can only rotate in a single direction.

7. The head mounted device as set forth in claim 6 wherein the pawl-ratchet mechanism includes an inner ratchet part arranged on an end face of the adjusting portion, a pawl mounted with limit on the cover and adapted to move axially with the cover, a compression spring adapted to push the pawl so that the end of the pawl is mated with the inner ratchet part, and a tumbler block mounted on the cover and connected with the pawl, the tumbler block adapted to detach the pawl from the inner ratchet part, the pawl including a guiding bevel face provided on one side of the end of the pawl, and the adjusting snob (83) is adapted to rotate in a single direction by means of the guiding bevel face after the pawl is mated with the inner ratchet part.

\* \* \* \* \*